United States Patent
Lu et al.

(10) Patent No.: US 9,160,244 B2
(45) Date of Patent: Oct. 13, 2015

(54) MAGNETIC INTEGRATION DOUBLE-ENDED CONVERTER

(71) Applicant: Huawei Technologies Co., Ltd., Shenzhen (CN)

(72) Inventors: Zengyi Lu, Fuzhou (CN); Yongfa Zhu, Shenzhen (CN); Yadong Bai, Shenzhen (CN); Wei Chen, Fuzhou (CN); Zhaoguo Jin, Shenzhen (CN)

(73) Assignee: Huawei Technologies Co., Ltd., Shenzhen (CN)

( * ) Notice: Subject to any disclaimer, the term of this patent is extended or adjusted under 35 U.S.C. 154(b) by 0 days.

(21) Appl. No.: 14/466,326

(22) Filed: Aug. 22, 2014

(65) Prior Publication Data
US 2014/0362607 A1 Dec. 11, 2014

Related U.S. Application Data

(63) Continuation of application No. 13/451,381, filed on Apr. 19, 2012, now Pat. No. 8,848,397, which is a continuation of application No. PCT/CN2011/070353, filed on Jan. 18, 2011.

(30) Foreign Application Priority Data

Jan. 19, 2010 (CN) .......................... 2010 1 0004094
Aug. 30, 2010 (CN) .......................... 2010 1 0266511

(51) Int. Cl.
*H02M 3/335* (2006.01)
*H02M 3/337* (2006.01)
(Continued)

(52) U.S. Cl.
CPC ............... *H02M 3/3376* (2013.01); *H01F 3/14* (2013.01); *H01F 27/38* (2013.01); *H02M 3/28* (2013.01); *H02M 3/33592* (2013.01); *H02M 2001/0064* (2013.01); *Y02B 70/1475* (2013.01)

(58) Field of Classification Search
USPC .............. 323/250, 251, 252, 255; 363/17, 98, 363/132, 136; 336/170, 178, 182, 215
See application file for complete search history.

(56) References Cited

U.S. PATENT DOCUMENTS

| 4,899,271 A | 2/1990 | Seiersen |
| 5,555,494 A | 9/1996 | Morris |

(Continued)

FOREIGN PATENT DOCUMENTS

| CN | 1447504 A | 10/2003 |
| CN | 1571259 A | 1/2005 |
| CN | 101030732 A | 9/2007 |
| CN | 201008125 Y | 1/2008 |
| CN | 101257255 A | 9/2008 |

(Continued)

OTHER PUBLICATIONS

Bloom, E., "Core Selection for & Design Aspects of an Integrated-Magnetic Forward Converter," 1986, pp. 141-150.

(Continued)

*Primary Examiner* — Nguyen Tran
(74) *Attorney, Agent, or Firm* — Conley Rose, P.C.; Grant Rodolph (57) ABSTRACT

A magnetic integration double-ended converter with an integrated function of a transformer and an inductor includes an integrated magnetic member having a magnetic core with three magnetic columns having at least three windings ($N_P$, $N_{S1}$, $N_{S2}$) and at least one energy storage air gap, where a primary winding ($N_P$) and a first secondary winding ($N_{S1}$) are both wound around a first magnetic column or are both wound around a second magnetic column and a third magnetic column, and a second secondary winding ($N_{S2}$) is wound around the second magnetic column; an inverter circuit with double ends symmetrically working, acting on the primary winding ($N_P$); and a group of synchronous rectifiers ($SR_1$, $SR_2$), gate electrode driving signals of which and gate electrode driving signals of a group of power switch diodes ($S_1$, $S_2$) of the inverter circuit with the double ends symmetrically working complement each other.

6 Claims, 6 Drawing Sheets (51) Int. Cl.
*H01F 3/14* (2006.01)
*H01F 27/38* (2006.01)
*H02M 3/28* (2006.01)
*H02M 1/00* (2007.01)

(56) References Cited

U.S. PATENT DOCUMENTS

| | | | |
|---|---|---|---|
| 5,784,266 | A | 7/1998 | Chen |
| 6,351,402 | B1 | 2/2002 | Carroll |
| 6,400,249 | B1 | 6/2002 | Jitaru |
| 6,549,436 | B1 * | 4/2003 | Sun ................................. 363/44 |
| 7,012,414 | B1 | 3/2006 | Mehrotra et al. |
| 7,034,647 | B2 * | 4/2006 | Yan et al. ...................... 336/212 |
| 7,742,318 | B2 * | 6/2010 | Fu et al. ......................... 363/16 |
| 8,223,509 | B2 * | 7/2012 | Won et al. ....................... 363/17 |
| 2003/0185021 | A1 | 10/2003 | Huang et al. |
| 2006/0038549 | A1 | 2/2006 | Mehrotra et al. |
| 2008/0224809 | A1 | 9/2008 | Zhang et al. |
| 2009/0161391 | A1 | 6/2009 | Matsumoto |
| 2010/0290256 | A1 * | 11/2010 | Zhou et al. ................. 363/21.02 |
| 2012/0201053 | A1 | 8/2012 | Lu et al. |

FOREIGN PATENT DOCUMENTS

| | | |
|---|---|---|
| CN | 101517878 A | 8/2009 |
| CN | 101728968 A | 6/2010 |
| WO | 2011088777 A1 | 7/2011 |

OTHER PUBLICATIONS

Xu, P., et al., "A Novel Integrated Current Doubler Rectifier," 2000, pp. 735-740.

Chen, W., et al., "Design of High Efficiency, Low Profile, Low Voltage Converter with Integrated Magnetics," 1997, pp. 911-917.

Severns, R., et al., "Modern DC-To-DC Switchmode Converter Circuits," Van Nostrand Reinhold Co., 1985, 5 pages.

"Reference by Preobrazovagelkoy Technology," Publishing House Technology, 1978, 3 pages.

Office Action dated May 10, 2013, 13 pages, U.S. Appl. No. 13/451,381, filed Apr. 19, 2012.

Office Action dated Aug. 29, 2013, 18 pages, U.S. Appl. No. 13/451,381, filed Apr. 19, 2012.

Foreign Communication From a Counterpart Application, PCT Application No. PCT/CN2011/070353, English Translation of International Search Report dated Apr. 28, 2011, 5 pages.

Foreign Communication From a Counterpart Application, PCT Application No. PCT/CN2011/070353, English Translation of Written Opinion dated Apr. 28, 2011, 6 pages.

Foreign Communication From a Counterpart Application, Russian Application No. 2012124058, Russian Office Action dated Oct. 30, 2013, 5 pages.

Foreign Communication From a Counterpart Application, Russian Application No. 2012124058, English Translation of Russian Office Action dated Oct. 30, 2013, 3 pages.

Foreign Communication From a Counterpart Application, European Application No. 11734359.0, Extended European Search Report dated Jul. 4, 2013, 7 pages.

Foreign Communication From a Counterpart Application, Chinese Application No. 201010266511.X, Chinese Office Action dated Nov. 24, 2011, 7 pages.

Foreign Communication From a Counterpart Application, Chinese Application No. 201010266511.X, English Translation of Chinese Office Action dated Nov. 24, 2011, 6 pages.

* cited by examiner

MAGNETIC INTEGRATION DOUBLE-ENDED CONVERTER

CROSS-REFERENCE TO RELATED APPLICATIONS

This application is a continuation of U.S. patent application Ser. No. 13/451,381, filed on Apr. 19, 2012, which is a continuation of International Application No. PCT/CN2011/070353, filed on Jan. 18, 2011. The International Application claims priority to Chinese Patent Application No. 201010004094.1, filed on Jan. 19, 2010 and Chinese Patent Application No. 201010266511.X, filed on Aug. 30, 2010. The afore-mentioned patent applications are hereby incorporated by reference in their entireties.

FIELD OF THE APPLICATION

The present application relates to a magnetic integration double-ended converter with an integrated function of a transformer and an inductor.

BACKGROUND OF THE APPLICATION

In an application scenario of direct-current converter with a wide-range input voltage, according to requirements of a power level, a single-ended converter (such as a flyback converter or a forward converter) or a double-ended converter (such as a half-bridge converter, a full-bridge converter, or a push-pull converter) may be used as a main power topology.

Figure 1:
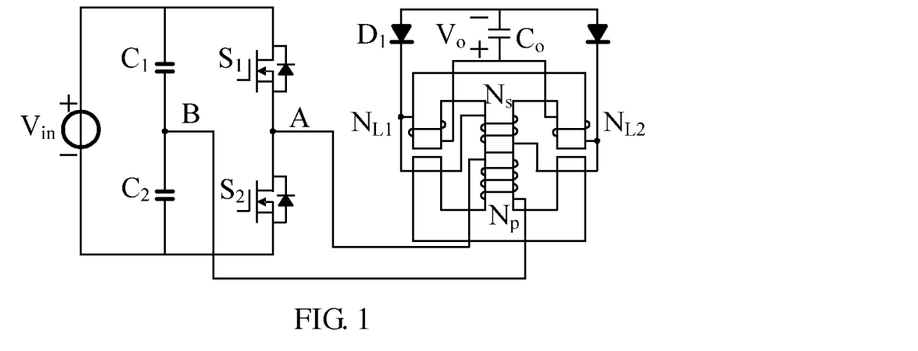
FIG. 1 shows a magnetic integration half-bridge converter in the prior art.

FIG. 1 shows an existing magnetic integration half-bridge converter, where an integrated magnetic member is an EE-shape magnetic core, a winding $N_P$ and a winding $N_S$ are wound around a central column of the EE-shape magnetic core to form a transformer, and a winding $N_{L1}$ and a winding $N_{L2}$ are wound around side columns of the EE-shape magnetic core to form an inductor.

During implementation, the above prior art at least has the problems of a significant loss of the windings and a large leakage inductance.

SUMMARY OF THE APPLICATION

Embodiments of the present application provide a magnetic integration double-ended converter, capable of reducing a loss of the windings and a leakage inductance of a primary side and a secondary side, and implementing high efficient conversion of energy.

An embodiment of the present application provides a magnetic integration double-ended converter, which includes an inverter circuit with double ends symmetrically working, acting on a primary winding; an integrated magnetic member having a magnetic core with three magnetic columns, including at least three windings and at least one energy storage air gap, where the primary winding and a first secondary winding are both wound around a first magnetic column, a second secondary winding is wound around the second magnetic column, and a total output current flows through the second secondary winding; and a group of synchronous rectifiers having a plurality of gate electrode driving signals, wherein the synchronous rectifiers' gate electrode driving signals are configured to work complementary with a plurality of gate electrode driving signals of a group of power switch diodes of the inverter circuit.

An embodiment of the present application provides another magnetic integration double-ended converter, which includes an inverter circuit with double ends symmetrically working, acting on a primary winding; an integrated magnetic member having a magnetic core with three magnetic columns, including at least three windings and at least one energy storage air gap, where the primary winding and a first secondary winding are both wound around a second magnetic column and a third magnetic column, a second secondary winding is wound around the second magnetic column, and a total output current flows through the second secondary winding; and a group of synchronous rectifiers having a plurality of gate electrode driving signals, wherein the synchronous rectifiers' gate electrode driving signals are configured to work complementary with a plurality of gate electrode driving signals of a group of power switch diodes of the inverter circuit.

It can be known from the technical solutions provided the embodiments of the present application that, the primary winding and the first secondary winding are wound around the same magnetic column, and the synchronous rectifier replaces a rectifier diode in the prior art, thereby reducing a turn-on loss of a switch device, and playing a part in zero voltage drop clamping of the secondary winding. In this way, least primary windings may be adopted to implement energy transferring from the primary side to the secondary side, thereby reducing a loss of the windings and a leakage inductance of the primary side and the secondary side, and implementing high efficient conversion of energy.

BRIEF DESCRIPTION OF THE DRAWINGS

To illustrate the technical solutions according to the embodiments of the present application more clearly, the following briefly introduces the accompanying drawings for describing the prior art and the embodiments of the present application.

DETAILED DESCRIPTION OF THE EMBODIMENTS

In order to make the objectives, technical solutions, and advantages of the present application more comprehensible, the technical solutions provided in the present application are described in further detail below with reference to embodiments and the accompanying drawings.

An embodiment of the present application provides a magnetic integration double-ended converter, which includes an inverter circuit with double ends symmetrically working, acting on a primary winding; an integrated magnetic member having a magnetic core with three magnetic columns, including at least three windings and at least one energy storage air gap, where the primary winding and a first secondary winding are wound around a first magnetic column, a second secondary winding is wound around a second magnetic column, and a total output current flows through the second secondary winding; and a group of synchronous rectifiers having a plurality of gate electrode driving signals, wherein the synchronous rectifiers' gate electrode driving signals are configured to work complementary with a plurality of gate electrode driving signals of a group of power switch diodes of the inverter circuit.

The inverter circuit with the double ends symmetrically working may be any one of a half-bridge inverter circuit, a full-bridge inverter circuit, and a push-pull circuit. When the inverter circuit with the double ends symmetrically working is the half-bridge inverter circuit, the magnetic integration double-ended converter provided in the embodiment of the present application may also be called a magnetic integration half-bridge inverter; similarly, when the inverter circuit with the double ends symmetrically working is the full-bridge inverter circuit or the push-pull circuit, the magnetic integration double-ended converter provided in the embodiment of the present application may also be called a magnetic integration full-bridge inverter or magnetic integration push-pull inverter accordingly.

In an example that the inverter circuit with the double ends symmetrically working is the half-bridge inverter circuit, the magnetic integration double-ended converter provided in the embodiment of the present application may have the following specific structure.

Embodiment 1

Figure 2:
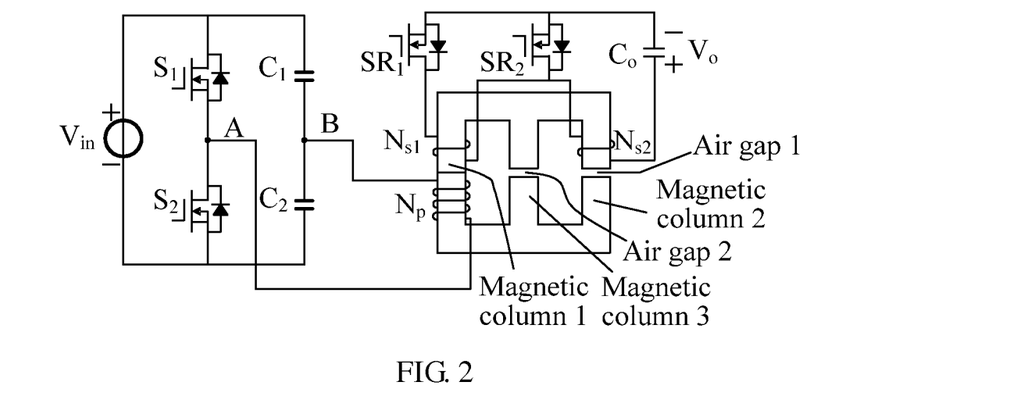
FIG. 2 shows a magnetic integration half-bridge converter provided in Embodiment 1 of the present application.

FIG. 2 shows a magnetic integration half-bridge converter in Embodiment 1, where a half-bridge inverter circuit on a primary side includes voltage dividing capacitors $C_1$ and $C_2$ and power switch diodes $S_1$ and $S_2$. An integrated magnetic member of the magnetic integration half-bridge converter includes an EE-shape magnetic core. The EE-shape magnetic core includes three windings and two energy storage air gaps. A primary winding $N_p$ and a first secondary winding $N_{s1}$ are wound around a first magnetic column 1, a second secondary winding $N_{s2}$ is wound around a second magnetic column 2, an energy storage air gap 1 is disposed on the second magnetic column 2, and an energy storage air gap 2 is disposed on a third magnetic column 3. Two ends of the primary winding $N_p$ are respectively connected to a connection point A of bridge arms of the power switch diodes $S_1$ and $S_2$ of the half-bridge inverter circuit and a connection point B of the voltage dividing capacitors $C_1$ and $C_2$ of the half-bridge inverter circuit.

The first secondary winding $N_{s1}$, the second secondary winding $N_{s2}$, an output filtering capacitor $C_o$, and a first synchronous rectifier $SR_1$ form a power circuit on a secondary side; the second secondary winding $N_{s2}$, the output filtering capacitor $C_o$, and a second synchronous rectifier $SR_2$ form another power circuit on the secondary side. A series branch of the first synchronous rectifier $SR_1$ and the first secondary winding $N_{s1}$ is connected to the second synchronous rectifier $SR_2$ in parallel. A current flowing through the second secondary winding $N_{s2}$ is a sum of currents of the synchronous rectifiers $SR_1$ and $SR_2$.

Figure 3:
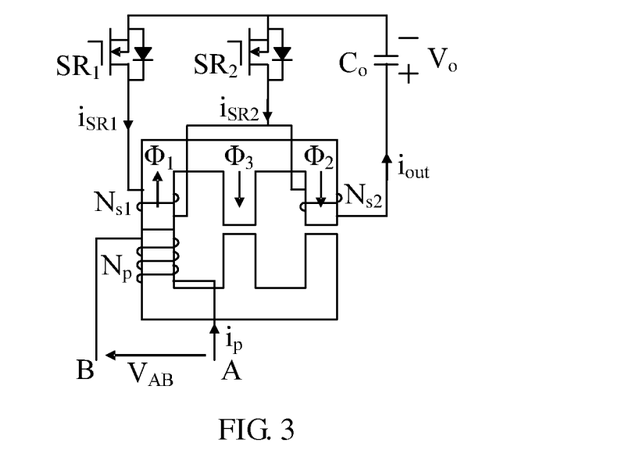
FIG. 3 is a schematic analysis diagram of an integrated magnetic member having a magnetic integration double-ended converter provided in Embodiment 1 of the present application.
Figure 4:
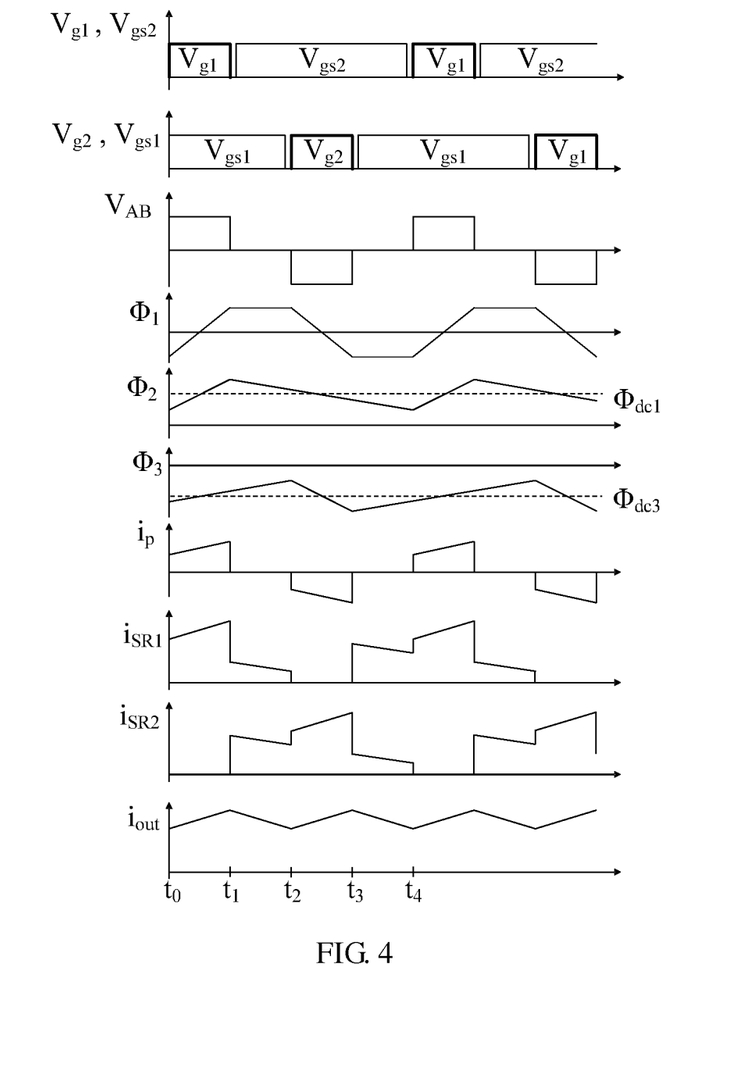
FIG. 4 is a schematic diagram of a working waveform of the magnetic integration half-bridge converter provided in Embodiment 1 of the present application.

Referring to FIG. 3 and FIG. 4, according to a working principle of a symmetrical half-bridge, the power switch diodes $S_1$ and $S_2$ on the primary side undergo driving voltages $V_{g1}$ and $V_{g2}$ having a phase difference of 180 degrees (°) to form a square wave inverting voltage $V_{AB}$ at the two ends of the primary winding $N_p$. Driving voltages of the synchronous rectifiers $SR_1$ and $SR_2$ on the secondary side are respectively $V_{gs1}$ and $V_{gs2}$, where $V_{gs1}$ and $V_{g2}$ complement each other, and $V_{gs2}$ and $V_{g1}$ complement each other. Therefore, a working process of the circuit may be divided into four stages.

Stage 1 [$t_0$-$t_1$]: The power switch diode $S_1$ on the primary side is turned on and $S_2$ is turned off, and the synchronous rectifier $SR_1$ on the secondary side is turned on and $SR_2$ is turned off. A voltage applied on the two ends of the primary winding $N_p$ is input voltage ($V_{in}$)/2, $\phi_1$ of the first magnetic column 1 where the primary winding is located is increased linearly, and magnetic fluxes $\phi_2$ and $\phi_3$ of other two magnetic columns are increased accordingly. A current $i_{SR1}$ of the first secondary winding $N_{s1}$ is equal to a current output ($i_{out}$) of the second secondary winding $N_{s2}$.

Stage 2 [$t_1$-$t_2$]: The power switch diodes $S_1$ and $S_2$ on the primary side are both turned off, and the synchronous rectifiers $SR_1$ and $SR_2$ on the secondary side are both turned on. A current $i_p$ of the primary winding $N_p$ is zero. The first secondary winding $N_{s1}$ is shorted by $SR_1$ and $SR_2$, so that voltages of the windings $N_p$ and $N_{s1}$ wound around the first magnetic column 1 are zero, the magnetic flux $\phi_1$ remains unchanged, and a decrease in the magnetic flux of the second magnetic column 2 is equal to an increment in the magnetic flux of the third magnetic column 3. The two synchronous rectifiers on the secondary side are both turned on, a part of the current $i_{SR1}$ flowing through $SR_1$ is transferred to $SR_2$, and a sum of the currents of the two synchronous rectifiers on the secondary side is equal to $i_{out}$.

Stage 3 [$t_2$-$t_3$]: The power switch diode $S_2$ on the primary side is turned on and $S_1$ is turned off, and the synchronous rectifier $SR_2$ on the secondary side is turned on and $SR_1$ is turned off. The voltage applied on the two ends of the primary winding $N_p$ is $-V_{in}/2$, $\phi_1$ of the first magnetic column 1 where the primary winding is located is decreased linearly, and the magnetic fluxes $\phi_2$ and $\phi_3$ of other two magnetic columns are decreased accordingly. The current $i_{out}$ of the second secondary winding $N_{s2}$ totally flows through the synchronous rectifier $SR_2$.

Stage 4 [$t_3$-$t_4$]: The power switch diodes $S_1$ and $S_2$ on the primary side are both turned off, and the synchronous rectifiers $SR_1$ and $SR_2$ on the secondary side are both turned on. The current $i_p$ of the primary winding $N_p$ is zero. The first secondary winding $N_{s1}$ is shorted by $SR_1$ and $SR_2$, so that the voltages of the windings $N_p$ and $N_{s1}$ wound around the first magnetic column 1 are zero, the magnetic flux $\phi_1$ remains unchanged, and a decrease in the magnetic flux of the second magnetic column 2 is equal to an increment in the magnetic flux of the third magnetic column 3. The two synchronous rectifiers on the secondary side are both turned on, a part of the current $i_{SR2}$ flowing through $SR_2$ is transferred to $SR_1$, and a sum of the currents is equal to $i_{out}$.

According to continuity of a magnetic flux, an input-to-output voltage conversion ratio may be derived:

$$\frac{V_o}{V_{in}} = \frac{N_{s1}}{N_p}\frac{D}{2},$$

where D refers to a duty cycle, which is obtained by dividing a turn-on time of the power switch diode $S_1$ by a switching period.

Embodiment 2

Figure 5:
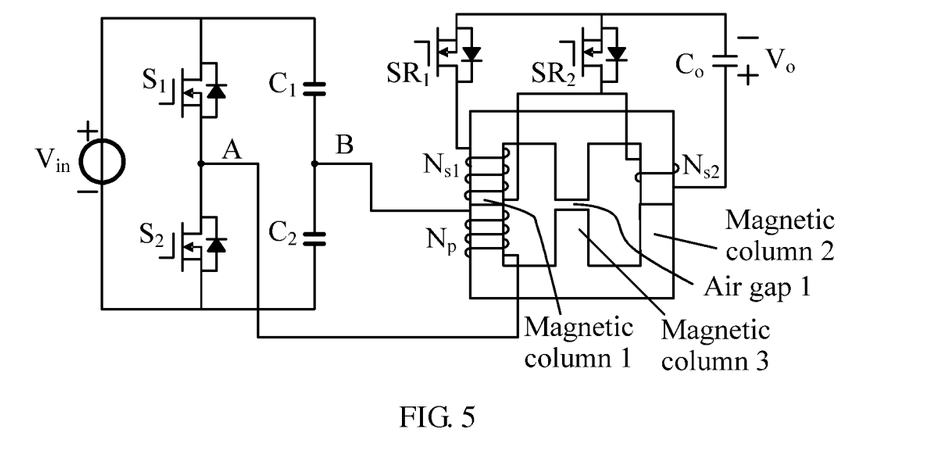
FIG. 5 shows a magnetic integration half-bridge converter provided in Embodiment 2 of the present application.

FIG. 5 shows a magnetic integration half-bridge converter of Embodiment 2. The difference between the magnetic integration half-bridge converter of Embodiment 2 and the magnetic integration half-bridge converter of Embodiment 1 is that, an EE-shape magnetic core of Embodiment 2 includes three windings and one energy storage air gap. A primary winding $N_p$ and a first secondary winding $N_{s1}$ are wound around a first magnetic column 1, a second secondary winding $N_{s2}$ is wound around a second magnetic column 2, an energy storage air gap 1 is disposed on a third magnetic column 3, and the number of turns of the first secondary winding $N_{s1}$ is twice the number of turns of the second secondary winding $N_{s2}$.

Referring to FIG. 5, a working process of the circuit of Embodiment 2 may also be divided into four stages:

Stage 1 [$t_0$-$t_1$]: The power switch diode $S_1$ on the primary side is turned on and $S_2$ is turned off, and the synchronous rectifier $SR_1$ on the secondary side is turned on and $SR_2$ is turned off. A voltage applied on the two ends of the primary winding $N_p$ is $V_{in}/2$, $\phi_1$ of the first magnetic column 1 where the primary winding $N_p$ is located is increased linearly, a magnetic flux $\phi_2$ of the second magnetic column 2 is increased linearly, and a magnetic flux $\phi_3$ of the third magnetic column 3 is decreased linearly. A current $i_{SR1}$ of the first secondary winding $N_{s1}$ is equal to a current $i_{out}$ of the second secondary winding $N_{s2}$.

Stage 2 [$t_1$-$t_2$]: The power switch diodes $S_1$ and $S_2$ on the primary side are both turned off, and the synchronous rectifiers $SR_1$ and $SR_2$ on the secondary side are both turned on. The current $i_p$ of the primary winding $N_p$ is zero. The first secondary winding $N_{s1}$ is shorted by $SR_1$ and $SR_2$, so that the voltages of the windings $N_p$ and $N_{s1}$ wound around the first magnetic column 1 are zero, the magnetic flux $\phi_1$ remains unchanged, and a decrease in the magnetic flux of the second magnetic column 2 is equal to an increment in the magnetic flux of the third magnetic column 3. The two synchronous rectifiers on the secondary side are both turned on, the current $i_{SR1}$ flowing through $SR_1$ is equal to a current $i_{SR2}$ flowing through $SR_2$, and a sum of the two currents is equal to $i_{out}$.

Stage 3 [$t_2$-$t_3$]: The power switch diode $S_2$ on the primary side is turned on and $S_1$ is turned off, and the synchronous rectifier $SR_2$ on the secondary side is turned on and $SR_1$ is turned off. The voltage applied on the two ends of the primary winding $N_p$ is $-V_{in}/2$, $\phi_1$ of the first magnetic column 1 where the primary winding $N_p$ is located is decreased linearly, and the magnetic fluxes $\phi_2$ and $\phi_3$ of other two magnetic columns are decreased linearly. The current $i_{out}$ of the second secondary winding $Ns_2$ totally flows through the synchronous rectifier $SR_2$.

Stage 4 [$t_3$-$t_4$]: The power switch diodes $S_1$ and $S_2$ on the primary side are both turned off, and the synchronous rectifiers $SR_1$ and $SR_2$ on the secondary side are both turned on. The current $i_p$ of the primary winding $N_p$ is zero. The first secondary winding $N_{s1}$ is shorted by $SR_1$ and $SR_2$, so that the voltages of the windings $N_p$ and $N_{s1}$ wound around the first magnetic column 1 are zero, the magnetic flux $\phi_1$ remains unchanged, and a decrease in the magnetic flux of the second magnetic column 2 is equal to an increment in the magnetic flux of the third magnetic column 3. The two synchronous rectifiers on the secondary side are both turned on, the current $i_{SR1}$ flowing through $SR_1$ is equal to a current $i_{SR2}$ flowing through $SR_2$, and a sum of the two currents is equal to $i_{out}$.

According to continuity of a magnetic flux, an input-to-output voltage conversion ratio may be derived:

$$\frac{V_o}{V_{in}} = \frac{N_{s1}}{N_p}\frac{D}{2},$$

where D refers to a duty cycle, which is obtained by dividing a turn-on time of the power switch diode $S_1$ by a switching period.

No energy storage air gap is disposed on the first magnetic column 1 and the second magnetic column 2, so it can be considered that equivalent magnetic resistance of the magnetic columns is zero. Therefore, an equivalent output filtering inductance $L_{out}$ of Embodiment 2 may be represented as:

$$L_{out} = \frac{N_{s2}^2}{R_{m3}},$$

where $R_{m3}$ is equivalent magnetic resistance of the third magnetic column 3.

Embodiment 3

Figure 7:
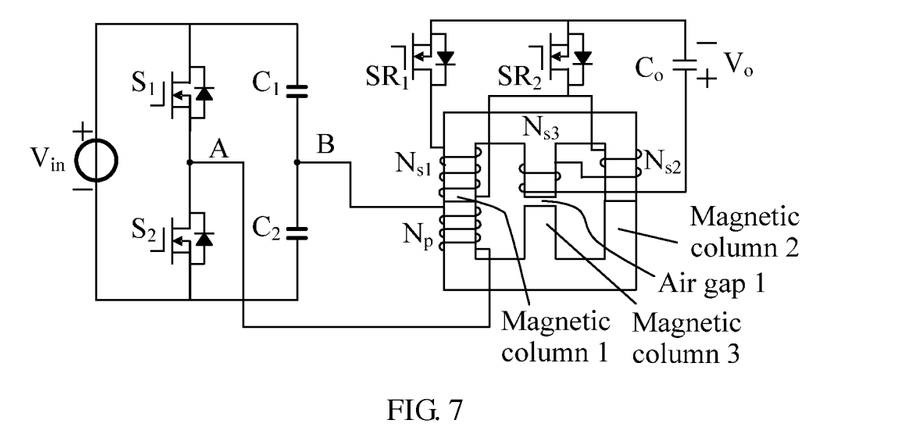
FIG. 7 shows a magnetic integration half-bridge converter provided in Embodiment 3 of the present application.

FIG. 7 shows a magnetic integration half-bridge converter of Embodiment 3. On the basis of Embodiment 2, a third secondary winding $N_{s3}$ is added on a third magnetic column 3. Specifically, an EE-shape magnetic core of Embodiment 3 includes four windings and one energy storage air gap. A primary winding $N_p$ and a first secondary winding $N_{s1}$ are wound around a first magnetic column 1, a second secondary winding $N_{s2}$ is wound around a second magnetic column 2, the third winding $N_{s3}$ is wound around the third magnetic column 3, an energy storage air gap 1 is defined in the third magnetic column 3, and the number of turns of the first secondary winding $N_{s1}$ is twice the number of turns of the second secondary winding $N_{s2}$.

In this case, the first secondary winding $N_{s1}$, the second secondary winding $N_{s2}$, the third secondary winding $N_{s3}$, an output filtering capacitor $C_o$, and a first synchronous rectifier $SR_1$ form a power circuit on the secondary side; the second secondary winding $N_{s2}$, the third secondary winding $N_{s3}$, the output filtering capacitor $C_o$, and a second synchronous rectifier $SR_2$ form another power circuit on the secondary side. A series branch of the first synchronous rectifier $SR_1$ and the first secondary winding $N_{s1}$ is connected to the second synchronous rectifier $SR_2$ in parallel. The second secondary winding $N_{s2}$ and the third secondary winding $N_{s3}$ are connected in parallel, so as to increase an output filtering inductance. A current flowing through the second secondary winding $N_{s2}$ and the third secondary winding $N_{s3}$ is a sum of currents of the synchronous rectifiers $SR_1$ and $SR_2$.

Figure 6:
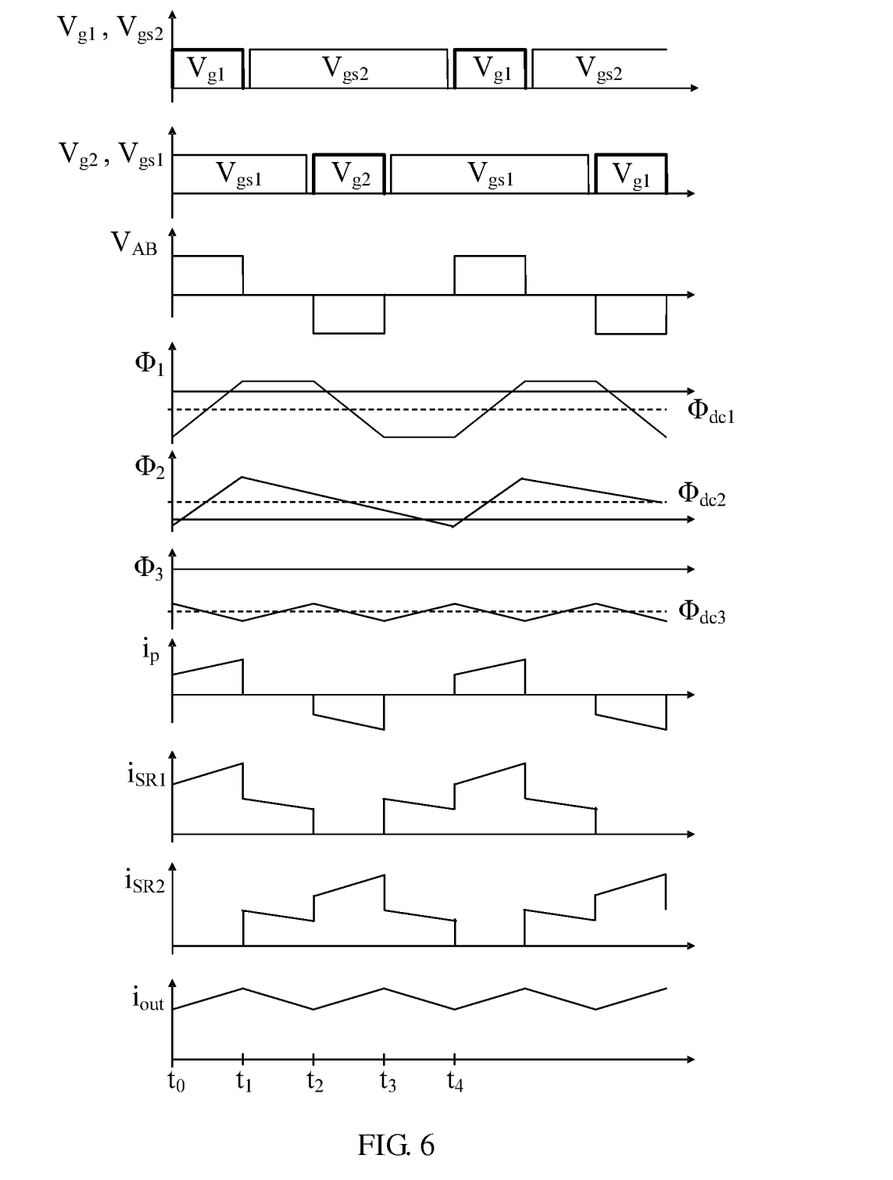
FIG. 6 is a schematic diagram of a working waveform of the magnetic integration half-bridge converter provided in Embodiment 2 of the present application.

In comparison with Embodiment 2, in Embodiment 3, the third secondary winding $N_{s3}$ is added on the third magnetic column 3, so as to improve the output filtering inductance of the circuit without influence on the working mode of the circuit. Therefore, for working timing of the circuit of the synchronous rectifier and the output circuit, reference may also be referred to FIG. 6. In this case, an equivalent output filtering inductance $L_{out}$ of Embodiment 3 may be represented as:

$$L_{out} = \frac{(N_{s2} + N_{s3})^2}{R_{m3}},$$

where $R_{m3}$ is equivalent magnetic resistance of the third magnetic column 3.

Embodiment 4

Figure 12:
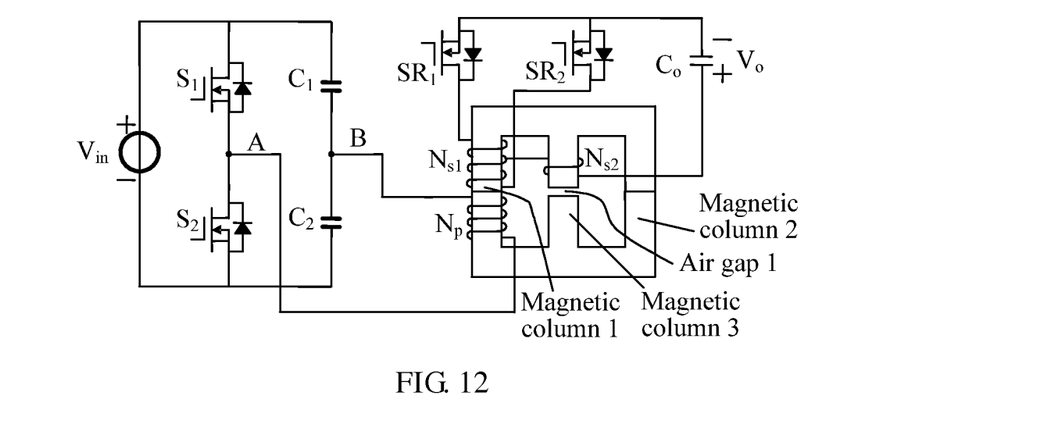
FIG. 12 shows a magnetic integration half-bridge converter provided in Embodiment 4 of the present application.

FIG. 12 shows a magnetic integration half-bridge converter of Embodiment 4. The difference between the magnetic integration half-bridge converter of Embodiment 4 and the magnetic integration half-bridge converter of Embodiment 1 is that, an EE-shape magnetic core of Embodiment 4 includes three windings and one energy storage air gap. A primary winding $N_p$ and a first secondary winding $N_{s1}$ are wound around a first magnetic column 1, a second secondary winding $N_{s2}$ is wound around a third magnetic column 3, an energy storage air gap 1 is disposed on the third magnetic column 3, the number of turns of the first secondary winding $N_{s1}$ is twice the number of turns of the second secondary winding $N_{s2}$, and the first secondary winding $N_{s1}$ is drawn out of the second secondary winding $N_{s2}$.

A working process of the circuit of Embodiment 4 is the same as that of Embodiment 2.

In sum, in the example that the inverter circuit with the double ends symmetrically working is the half-bridge inverter circuit, in the magnetic integration double-ended converter provided in the embodiment of the present application, the primary winding and the first secondary winding are wound around the same magnetic column, and a synchronous rectifier replaces a rectifier diode in the prior art, thereby reducing a turn-on loss of a switch device, and clamping the voltage of the first secondary winding $N_{s1}$ to 0 in stages 2 and 4, so as to play a part in zero voltage drop clamping of the secondary winding. In this way, least primary windings may be adopted to implement energy transferring from the primary side to the secondary side, thereby reducing a loss of the windings and a leakage inductance of the primary side and the secondary side, and implementing high efficient conversion of energy.

Figure 8:
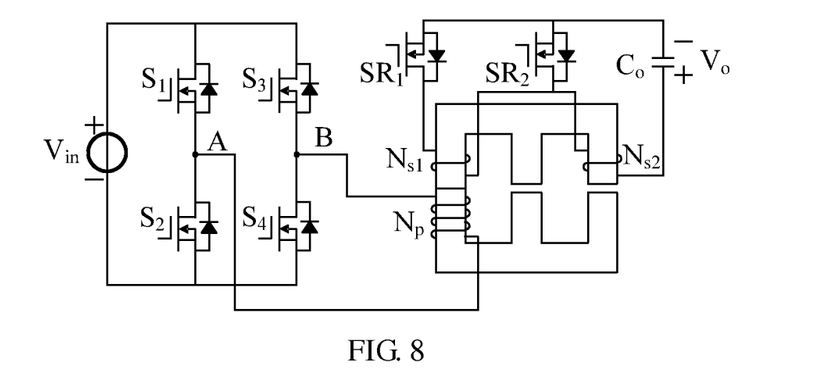
FIG. 8 shows a magnetic integration full-bridge inverter provided in an embodiment of the present application.
Figure 9:
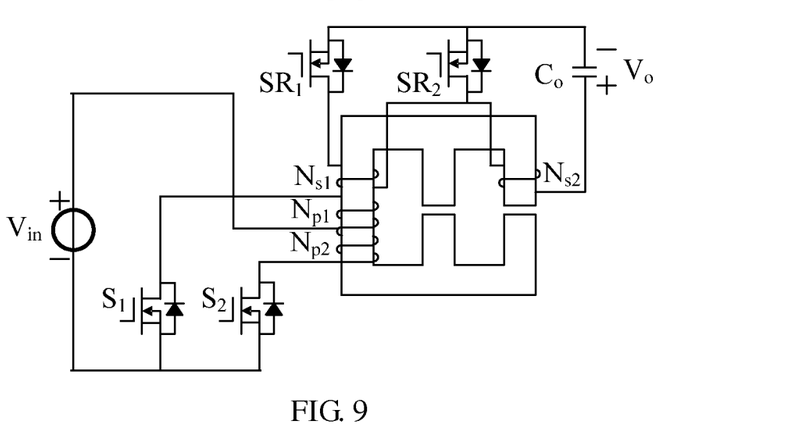
FIG. 9 shows a magnetic integration push-pull converter provided in an embodiment of the present application.

It can be understood that, according to different topology structures of inverter circuits, the inverter circuit with the double ends symmetrically working may also be the full-bridge inverter circuit and the push-pull circuit, for example, a magnetic integration full-bridge inverter in FIG. 8 and a magnetic integration push-pull converter in FIG. 9.

In the magnetic integration full-bridge inverter in FIG. 8, except that a topology structure of the inverter circuit on the primary side is different from that of the magnetic integration half-bridge converter in FIG. 2, FIG. 5, or FIG. 7, windings on the primary side and the secondary side are the same as those of the magnetic integration half-bridge converter in FIG. 2, FIG. 5, or FIG. 7. The magnetic integration push-pull converter in FIG. 9 has two primary windings, being respectively $N_{p1}$ and $N_{p2}$, that is, has one more primary winding than the full-bridge and the half-bridge, but the primary windings $N_{p1}$ and $N_{p2}$ are wound around the same magnetic column, the winding structure on the secondary side is the same as that of the magnetic integration half-bridge inverter. Therefore, the working timing and internal magnetic fluxes $\phi_1$, $\phi_2$, and $\phi_3$ of forming magnetic cores of the magnetic integration full-bridge inverter in FIG. 8 and the magnetic integration push-pull converter in FIG. 9 are respectively the same as those of the magnetic integration half-bridge converter of the present application.

Figure 10:
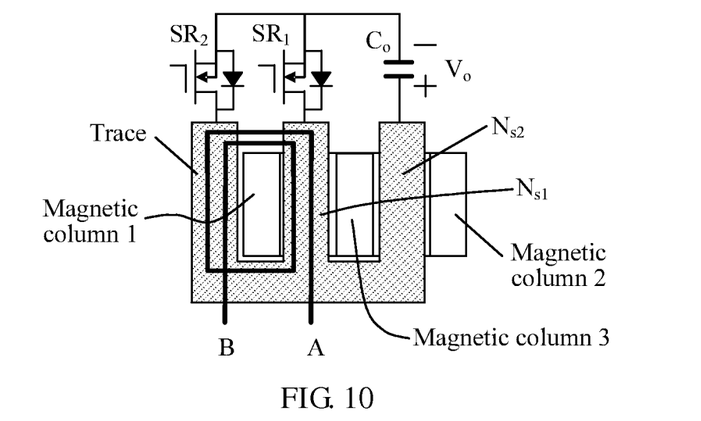
FIG. 10 is a schematic diagram of a magnetic integration double-ended converter provided in an embodiment of the present application when secondary windings each have one turn.

When the primary winding $N_p$ and the first secondary winding $N_{s1}$ are wound around the first magnetic column 1, and the second secondary winding $N_{s2}$ is wound around the second magnetic column 2, referring to FIG. 10, if the secondary windings $N_{s1}$ and $N_{s2}$ each have one turn, a shadow region in FIG. 10 represents a copper sheet of a secondary winding power loop of an E shape with an upward opening and including three parts, where two parts of the copper sheet pass through a magnetic core window and are respectively windings $N_{s1}$ and $N_{s2}$, the third part is connected to the secondary rectifier $SR_2$ outside the magnetic core and is a trace part. The primary winding $N_p$ is wound around the first magnetic column 1. A part of the primary winding $N_p$ is in the same winding window as $N_{s1}$; and a part of the primary winding $N_p$ is exposed outside the magnetic core window, so as to ensure a good coupling relationship between the part of the primary winding $N_p$ and the trace. In this way, the high efficient energy switching from the primary winding $N_p$ to the secondary windings $N_{s1}$ and $N_{s2}$ can be implemented, and an effective zero voltage drop clamping function of $SR_1$ and $SR_2$ on the secondary windings can be ensured.

The energy storage air gap of the E-shaped magnetic core is disposed on the second magnetic column 2 and the third magnetic column 3 or is disposed only on the third magnetic column 3, and therefore, in order to more effectively control magnetic field distribution outside the integrated magnetic member, in the magnetic integration double-ended converter provided in the embodiment of the present application, the primary winding $N_p$ and the first secondary winding $N_{s1}$ may also be wound around the second magnetic column 2 and the third magnetic column 3 at the same time, and other structures keep the same.

Figure 11:
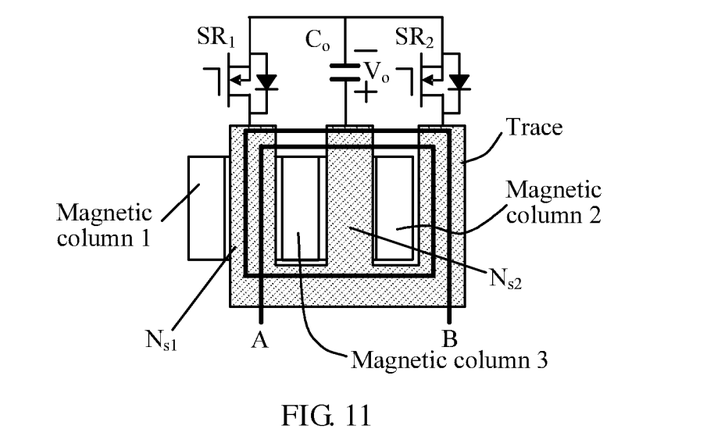
FIG. 11 is a schematic diagram of another magnetic integration double-ended converter provided in an embodiment of the present application when secondary windings each have one turn.

Referring to FIG. 11, when the primary winding $N_p$ and the first secondary winding $N_{s1}$ are wound around the second magnetic column 2 and the third magnetic column 3 at the same time, and the second secondary winding $N_{s2}$ is wound around the second magnetic column 2, if the secondary windings $N_{s1}$ and $N_{s2}$ each have one turn, a shadow region in FIG. 11 represents a copper sheet of a secondary winding power loop of an E shape with an upward opening and including three parts, where two parts of the copper sheet pass through a magnetic core window and are respectively windings $N_{s1}$ and $N_{s2}$, the third part is connected to the secondary rectifier $SR_2$ outside the magnetic core and is a trace part. The primary winding $N_p$ is wound around the second magnetic column 2 and the third magnetic column 3. A part of the primary winding $N_p$ is in the same winding window as $N_{s1}$; and a part of the primary winding $N_p$ is exposed outside the magnetic core window, so as to ensure a good coupling relationship between the part of the primary winding $N_p$ and the trace. The difference between FIG. 11 and FIG. 10 is that, the trace part follows the external side of the primary winding $N_p$ being wound around the second magnetic column 2, so as to ensure keeping good coupling with the primary part.

Based on the foregoing description, an embodiment of the present application provides another magnetic integration double-ended converter, which includes an inverter circuit with double ends symmetrically working, acting on a primary winding; an integrated magnetic member having a magnetic core with three magnetic columns, including at least three windings and at least one energy storage air gap, where the primary winding and a first secondary winding are both wound around a second magnetic column and a third magnetic column, a second secondary winding is wound around the second magnetic column, and a total output current flows through the second secondary winding; and a group of synchronous rectifiers having a plurality of gate electrode driving signals, wherein the synchronous rectifiers' gate electrode driving signals are configured to work complementary with a plurality of gate electrode driving signals of a group of power switch diodes of the inverter circuit.

In an embodiment, the integrated magnetic member having the magnetic core with the three magnetic columns includes three windings and two energy storage air gaps, where the primary winding and the first secondary winding are both wound around the second magnetic column and the third magnetic column, the second secondary winding is wound around the second magnetic column, the total output current flows through the second secondary winding, and the energy storage air gaps are respectively disposed on the second magnetic column and the third magnetic column. In this embodiment, the number of turns of the first secondary winding and the number of turns of the second secondary winding are not limited and may be the same or different.

In another embodiment, the integrated magnetic member having the magnetic core with the three magnetic columns includes three windings and one energy storage air gap, where the primary winding and the first secondary winding are both wound around the second magnetic column and the third magnetic column, the second secondary winding is wound around the second magnetic column, the total output current flows through the second secondary winding, and the energy storage air gap is disposed only on the third magnetic column. In this embodiment, the number of turns of the first secondary winding is required to be twice the number of turns of the second secondary winding.

In yet another embodiment, the integrated magnetic member having the magnetic core with the three magnetic columns includes four windings and one energy storage air gap, where the primary winding and the first secondary winding are both wound around the second magnetic column and the third magnetic column, the second secondary winding is wound around the second magnetic column, the third secondary winding is wound around the third magnetic column, the third secondary winding is connected to the second secondary winding in series, the total output current flows through the third secondary winding and the second secondary winding, and the energy storage air gap is disposed only on the third magnetic column. In this embodiment, the number of turns of the first secondary winding is also required to be twice the number of turns of the second secondary winding.

It can also be understood that, the inverter circuit with the double ends symmetrically working included in the magnetic integration double-ended converter may be any one of the half-bridge inverter circuit, the full-bridge inverter circuit, and the push-pull circuit, and can generate a square wave voltage signal acting on the primary winding.

It should be noted that, whether the primary winding and the first secondary winding are both wound around the first magnetic column without the energy storage air gap or are both wound around the second magnetic column and the third magnetic column with at least one energy storage air gap disposed, when the first secondary winding and/or the second secondary winding has one turn, the length of the winding is reduced, so the actual requirement is satisfied, and meanwhile, the loss of the winding can be reduced.

It should be finally noted that, the magnetic integration double-ended converter provided in the embodiment of the present application may be applicable to a direct current-direct current (DC-DC) secondary power source module as a communication device.

The foregoing embodiments are not intended to limit the present application. For persons skilled in the art, any modification, equivalent replacement, and improvement made without departing from the principle of the present application shall fall within the protection scope of the present application.

What is claimed is:

1. A magnetic integration double-ended converter, comprising:
    an inverter circuit with double ends symmetrically working, acting on a primary winding;
    an integrated magnetic member having a magnetic core with three magnetic columns, wherein the integrated magnetic member comprises at least three windings and at least one energy storage air gap, wherein the entire primary winding and a first secondary winding are both wound around a first magnetic column, wherein a second secondary winding is wound around a second magnetic column, wherein a total output current flows through the second secondary winding, wherein one air gap is disposed in the second magnetic column and a third magnetic column respectively, wherein there is no air gap in the first magnetic column, and wherein the third magnetic column is positioned between the first magnetic column and the second magnetic column; and
    a group of synchronous rectifiers having a plurality of gate electrode driving signals,
    wherein the synchronous rectifiers' gate electrode driving signals are configured to work complementary with a plurality of gate electrode driving signals of a group of power switch diodes of the inverter circuit.

2. The magnetic integration double-ended converter according to claim 1, wherein the second secondary winding has one turn.

3. The magnetic integration double-ended converter according to claim 1, wherein the first secondary winding has one turn.

4. The magnetic integration double-ended converter according to claim 3, wherein the second secondary winding has one turn.

5. The magnetic integration double-ended converter according to claim 1, wherein the inverter circuit with the double ends symmetrically working is any one of a half-bridge inverter circuit, a full-bridge inverter circuit, and a push-pull circuit.

6. The magnetic integration double-ended converter according to claim 1, wherein the two ends of the primary windings are directly connected to the inverter circuit.

* * * * *